(12) United States Patent
Langdon

(10) Patent No.: X318
(45) Date of Patent: Feb. 20, 1801

(54) HYDRAULIC MACHINE/HYDRAULIC ELEVATO

(76) Inventor: Barnabas Langdon

Barnabas Langdon
Letters Patent Issued Feb. 20, 1801

The schedule referred to in these Letters Patent and making part of
the same containing a description in the words of the said Barnabas Langdon
himself of his improvement Being a Hydraulic Machine for raising
water.

The Machine of which this is a description has with ease raised water to
the perpendicular height of thirty seven feet and ten and one quarter inches and
is considered as being competent to raise water to the double of that height and
is calculated to raise water for domestic uses and by being enlarged in a just
proportion may be competent to supply water to mills and other works
which may require an increased quantity of Water. It may also by being
enlarged with great utility and the saving of much labor supersede the use of
ordinary pumps in large ships. Rutland 19th January 1801. Subscrib-
ed & attested by the said Barnabas Langdon in presence of us
John A. Graham
Saml Walker B.s Langdon Ex^d
Ch.J.W.

1 1 G. 2 5?